Dec. 22, 1964

A. MILLER ETAL 3,162,565

TAPE SPLICER

Filed April 10, 1961

4 Sheets-Sheet 1

ARMIN MILLER &
FRANK M. GOODRICH
INVENTORS

BY Robert S. Clay

ATTORNEY

TAPE SPLICER

Filed April 10, 1961

ARMIN MILLER &
FRANK M. GOODRICH
INVENTORS

BY Robert S. Clay

ATTORNEY

TAPE SPLICER

Filed April 10, 1961

4 Sheets-Sheet 3

ARMIN MILLER &
FRANK M. GOODRICH
INVENTORS

BY Robert S. Clay

ATTORNEY

Dec. 22, 1964 A. MILLER ETAL 3,162,565

TAPE SPLICER

Filed April 10, 1961 4 Sheets-Sheet 4

ARMIN MILLER &
FRANK M. GOODRICH
INVENTOR.

BY Robert S. Clay

ATTORNEY

United States Patent Office 3,162,565
Patented Dec. 22, 1964

3,162,565

TAPE SPLICER

Armin Miller, Menlo Park, and Frank M. Goodrich, Redwood City, Calif., assignors to Ampex Corporation, Redwood City, Calif., a corporation of California Filed Apr. 10, 1961, Ser. No. 101,882
6 Claims. (Cl. 156—506)

This invention relates to devices for providing a precision joinder between separate lengths of elongated strip material, and more particularly to devices for editing and splicing magnetic tapes.

It is common practice today to splice together lengths of strip material, such as film or magnetic tape, to provide a continuous edited sequence or program. The editing function is also carried out when it is desired to replace worn or broken sections of the strip material and when it is desired to delete portions of the record. When carried out by hand, this editing and splicing procedure can be extremely time consuming and may result in a splice which is erratic in position and unreliable in performance. When the operation is performed manually, the ends of the two pieces to be joined together are trimmed, and then placed in abutting relation, after which a suitable splicing tape segment is affixed to the abutting ends. It is difficult to attain precision with this manual procedure, and it is also difficult to provide a reliable splice.

The need for high precision in splicing and editing is particularly evident when handling relatively wide magnetic tapes used in recording video information such as television programs. Here, splices must be made only at selected points, as where a new television frame is about to begin. When the splice is made, the cuts should be taken at precise points, and the cut edges must be held closely together, or the subsequently reproduced signals result in loss of synchronization. While various splicing devices are known, they have not satisfactorily combined automatic operation with the needed precision, nor have they provided the desired editing capabilities.

It is therefore an object of the present invention to provide an economical automatic splicing device for strip materials.

It is another object of the present invention to provide a device for precisely but automatically joining together lengths of film or magnetic tape with a firm and reliable coupling.

Yet another object of the present invention is to provide an improved editor and splicer for magnetic tape, which through a very simple operation trims and joins together ends of two different sections of magnetic tape.

Editors and splicers, in accordance with the present invention, provide a precise junction between two lengths of strip material, such as magnetic tape, by simultaneously shearing each of the lengths, moving the trimmed edges out of the way, placing the sheared ends in abutting relation, and pressing a piece of splicing material across the ends to form the joint. In a specific example of a device in accordance with the invention, a single movement of a control member is sufficient to carry out the aforementioned desired functions rapidly and in proper sequence. Strips of magnetic tape, for example, which are to be spliced together, are placed on a pair of spaced apart tables having cutting blade edges opposite to each other. A double edged shear block mounted above the space between the cutting edges is then moved down to cut the ends of the two tapes by pressure on a top part of a movable member, which also carries a length of splicing tape. As the movable member is further moved toward the tapes, the shear block is moved below the tables, and one of the tables is moved toward the other to a position at which the tapes are in abutting relation. The tapes are maintained in this position and a punch, which is also mounted in the movable member, is caused to cut out a segment of the splicing tape and to place it directly in position on the abutting edges of the two magnetic tape ends. The piece of splicing tape is then automatically pressed across the abutted ends of the magnetic tape strips so as to complete the splice. The movable member and the shear block and punch are then released so as to automatically return to the starting position. The spliced tape may be removed so that a new splicing operation may immediately be undertaken with new ends of magnetic tape.

The novel features of the invention may be better understood by reference to the following description, taken in conjunction with the accompanying drawing, in which.

Figure 1:
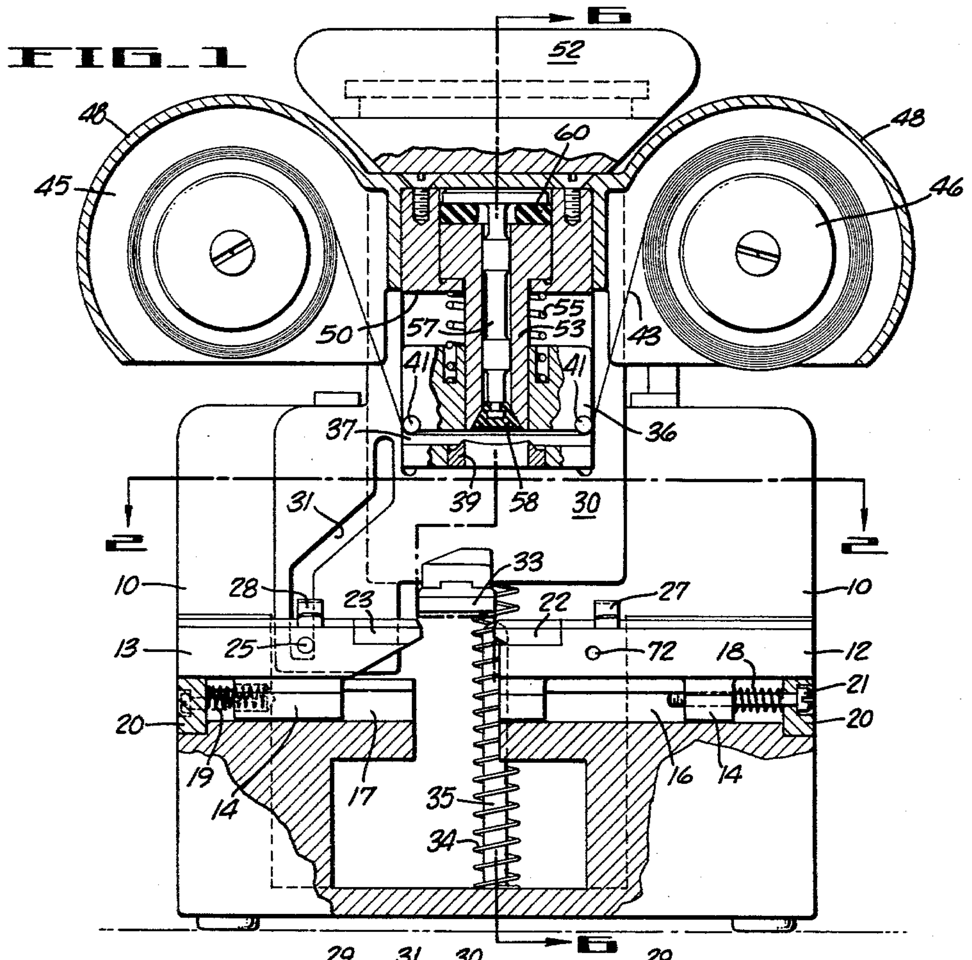
FIGURE 1 is a front elevation of a tape editor and splicer in accordance with the invention, parts of which are shown broken away for clarity.
Figure 2:
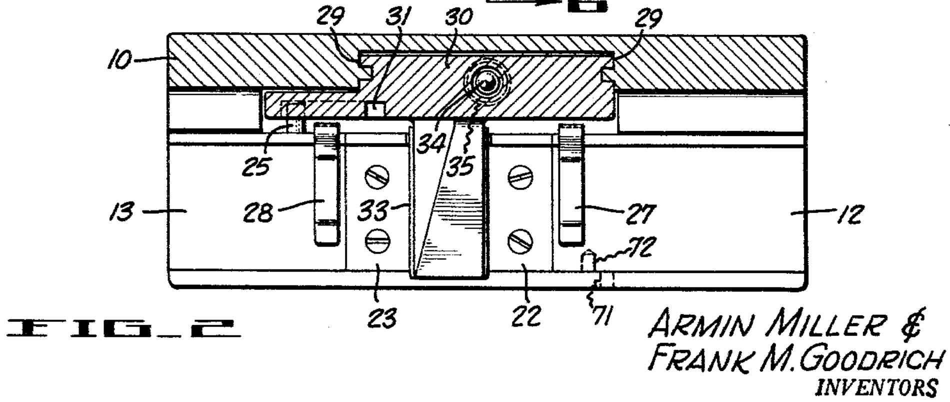
FIGURE 2 is a plan sectional view of the arrangement of FIGURE 1, taken along the lines 2—2 in FIGURE 1 and looking in the direction of the appended arrows.

Referring now to FIGURES 1 through 10, there is shown a device, according to the present invention, for splicing a magnetic tape. The device includes a main frame 10 on which the operative elements are supported or to which they are mechanically coupled. A pair of tables 12 and 13 are mounted on the main frame 10, there being a relatively stationary table 12 and a movable table 13. Each of the tables 12, 13 is movable along a transverse axis on the main frame 10, on ways 16, 17, respectively, which are provided on or affixed to the main frame 10, although as will be explained, table 12 is arranged to be movable only slightly for adjustment. Springs 18, 19 positioned between shoulders 14 on the tables 12, 13 respectively, and pads 20, which are coupled to the main frame, urge the tables 12, 13 toward each other. A bolt 21 affixed to the shoulder of the stationary table 12 and extending through the spring 18 is slidably movable in the pad 20 adjacent the stationary table 12. Accordingly, a slight outward movement of the stationary table 12 against the spring 18 is permitted, as is described in greater detail below.

At the adjacent edges of the tables 12, 13, each table is provided with an inset cutter blade 22, 23 respectively. The cutter blades 22, 23 may have beveled shearing edges for precise cooperation with a shear block 33 acting upon a magnetic tape (not shown in FIGURES 1 through 10). A follower pin 25 fixedly mounted on the movable table 13 extends in a direction normal to the axis of movement of the table 13. A pair of resilient tape holders 27, 28 are respectively fixed to the tables 12 and 13, and extend transversely across the direction of elongation of the magnetic tape mounted on each of the tables 12, 13, providing a guide and yieldable holder for maintaining the tape in position during operation.

A number of operative elements are mounted on a movable support plate 30 (best seen in FIGURE 2), which is slidably movable in vertical ways 29 in the main frame 10. The support plate 30 includes a guide slot 31 within which the follower pin 25 registers, and which is configured to provide a selected movement of the movable table 13 along the way 17 relative to the stationary table 12. A double edged shear block 33 is mounted on the movable support plate 30 between and adjacent to both of the cutting blades 22, 23 on the tables 12, 13 when in the separated position. The shear block 33 presents a shearing edge for contact and cooperation with each of the blades 22, 23. A compression spring 35 extends between the movable support plate 30 and the interior base of the main frame 10, and is supported on a post 34 extending upwardly from the interior base of main frame 10.

A die holder 36 is fixedly mounted to the movable support plate 30, and includes a channel 37 through which a splicing tape passes substantially parallel to the plane of movement of a magnetic tape on the tables 12, 13. At the end of the holder 36 adjacent to the tables 12 and 13 and centrally disposed about an axis passing along the cutting edge of the blade 22 on the stationary table 12, is mounted a formed die 39, here shown as circular. A pair of guides 41 are respectively mounted in spaced-apart relation at each end of the channel 37 on the die holder 36 to provide bearing surfaces for a splicing tape 43 fed through the channel from a supply spool 45 to a takeup spool 46. The spools 45 and 46 are each mounted in separate cartridges 48, the cover of which is not shown in the front elevations of FIGURES 1, 3 and 4. The splicing tape 43 is wound about the supply spool 45 and fed through the channel 37 such that the adhesive surface of the tape 43 faces the tables 12 and 13 and does not contact the guides 41.

The splicing tape cartridges 48 and a punch body member 50 including a head or handle 52 are mounted for vertical slidable movement on the movable support plate 30. Adjacent to the die holder 36, the punch body 50 terminates in a cylindrical punch 53 which registers slidably in a suitable aperture in the die holder and which conforms to the interior surface of the circular die 39. The configuration of the die 39 and the punch 53 may of course be any shape desired or found suitable for the particular type of splice and splicing tape which are used but the tape to be used is always wider than the diameter of the punch 53, so that the tape will not be completely severed during punching. The die holder 36 is normally held away from the punch body member 50 by a compression spring 55, which encompasses the cylindrical punch member 53. Interior to the punch member 53 is a punch insert 57. Adjacent to the operative end of the punch 53, a rubber pressure pad 58 is coupled to the punch insert 57 and provides a surface substantially flush with the protruding end of the punch 53 and parallel to the plane of the splicing tape between the guides 41. At the upper end of the punch insert 57, a resilient rubber pad 60 is positioned between the punch 53 and the head of the punch insert 57. The punch insert 57, punch 53 and punch body 50 are slidably movable relative to each other.

Figure 9:
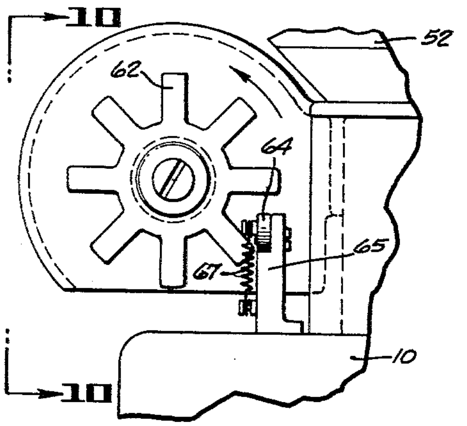
FIGURE 9 is a back view of a fragment of the arrangement of FIGURE 1.
Figure 10:
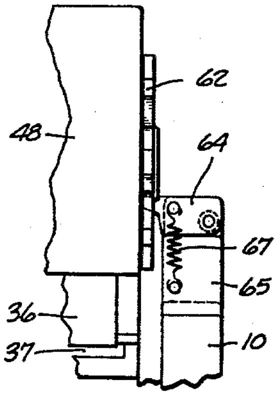
FIGURE 10 is an end view of the fragment shown in FIGURE 9, as viewed from the line 10—10 in FIGURE 9 while looking in the direction of the appended arrows.

As best seen in the detail views of FIGURES 9 and 10, a sprocket wheel indexing and tape advance mechanism is coupled to the takeup spool 46. A sprocket wheel 62 rotatable with the takeup spool 46 has a number of radially extending teeth spaced at selected angular positions determined by the size of the splicing tape segment that is to be taken with each splice, which is made. A tab 64 projecting between the teeth and rotatably mounted on a bracket 65 on the main frame 10 is normally held in a horizontal position (as viewed in the figures) by a tension spring 67.

Figure 11:
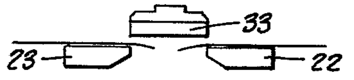
FIGURE 11 is a simplified diagrammatic representation of the relationship of the cutting elements to the strips at the start of an operation.

A better appreciation of the operation of the mechanism in splicing a magnetic tape may be had by reference to the simplified diagrammatic representations of FIGURES 11 through 15, as well as FIGURES 1 through 10. Prior to operation, the movable support plate 30 is urged by the compression spring 35 away from the main frame 10, so that the shear block 33 is held above the cutter blades 22, 23. As shown in FIGURE 11, opposing edges of separate magnetic tape strips may then be placed in position, with one tape segment being placed on the movable table 13, passing under the resilient tape holder 28, and the other tape segment being fed from the opposite side to lie on the stationary table 12 under the other resilient tape holder 27. The edges of the two magnetic tape segments may be precisely positioned relative to the operative surfaces of the cutter blades 22, 23. If desired, for example, a magnetizable powder may be coated on the two tape segments so as to reveal the magnetic patterns thereon. The point at which the edges of the two tape segments are to be sheared is known, and may be identified by appropriate indicia on the main frame 10 or on the tables 12, 13. If desired, a micrometer adjustment (not shown) may be mounted on the frame, or each of the tables, to control the accuracy of positioning to a thousandth of an inch or less. Alternatively, a microscope viewer with crosshairs or other indicia may be utilized where extremely high precision is desired. With audio recording tapes, and most other types of recording tapes, sufficient precision is obtained simply by visual adjustment of the tape segments.

The entire operation is carried out by downward movement of the head 52, either manually or by appropriate mechanical or magnetic means. In the first part of the cycle of operation, the relative separation between the cutter blades 22, 23 is maintained as the double edged shear block 33 is moved downwardly between them. During this interval, the follower pin 25 registers with a vertical part of the path defined by the guide slot 31, so that the movable table 13 is held in position during the downward movement of the support plate 30. It should be noted here that the strength of the compression spring 35 against which the support plate 30 acts is selected to be less than that of the compression spring 55 which holds the punch body 50 and the punch 53 away from the die holder 36. Accordingly, the relative position of the punch 53 with respect to the splicing tape 43 and the circular die 39 is not changed during this initial interval.

Figure 3:
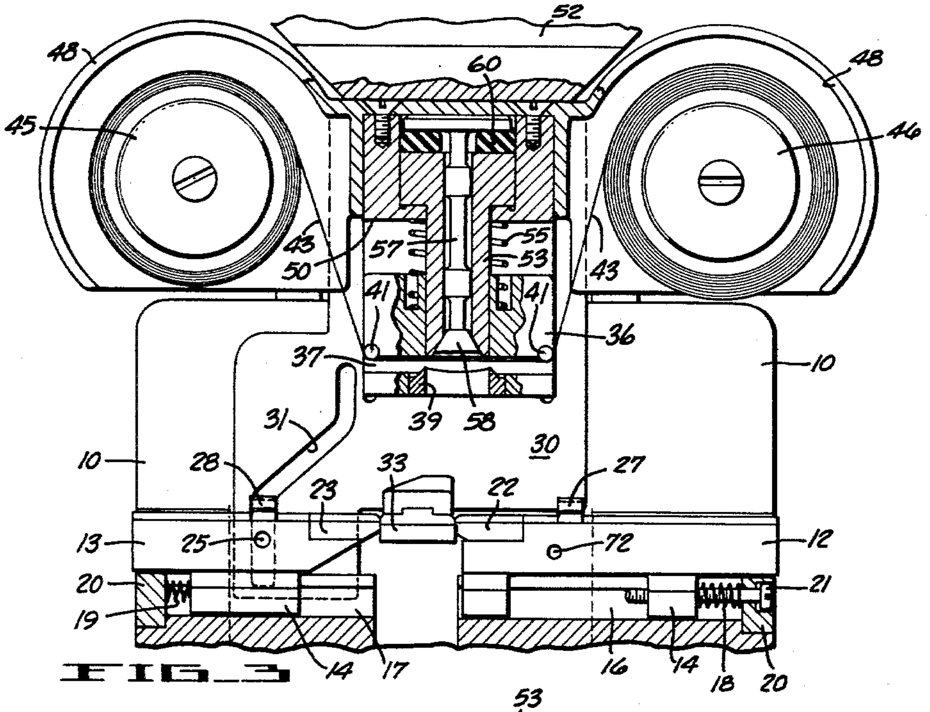
FIGURE 3 is a front elevation of the arrangement of FIGURE 1, showing the position of operation of the elements immediately following shearing of the tape.
Figure 12:
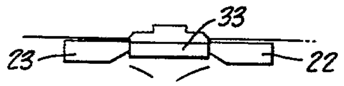
FIGURE 12 is a simplified diagrammatic representation of the relationship of the cutting elements to the strips immediately following the cutting of the ends of the strips.

The physical relationship of the elements at this stage is therefore shown in FIGURES 3 and 12. In both of these figures, the shear block 33 is moved down past the beveled edges of the cutter blades 22, 23, shearing off the extended edges of the magnetic tape segments at selected points. The discarded edges are permitted to drop freely and accordingly present no danger of interfering with the splice. Note that, as seen in FIGURE 3, the bolt 21 which is threaded into the shoulder element 14 of the stationary table 12 moves slidably through the pad 20, and the stationary table 12 moves slightly against the spring 18 as the cut is carried out. This feature insures a clean cut and greater precision in the point at which the cut is taken. At the end of this step, the two strips of magnetic tape appear as shown in the view designated A of FIGURE 15.

Figure 4:
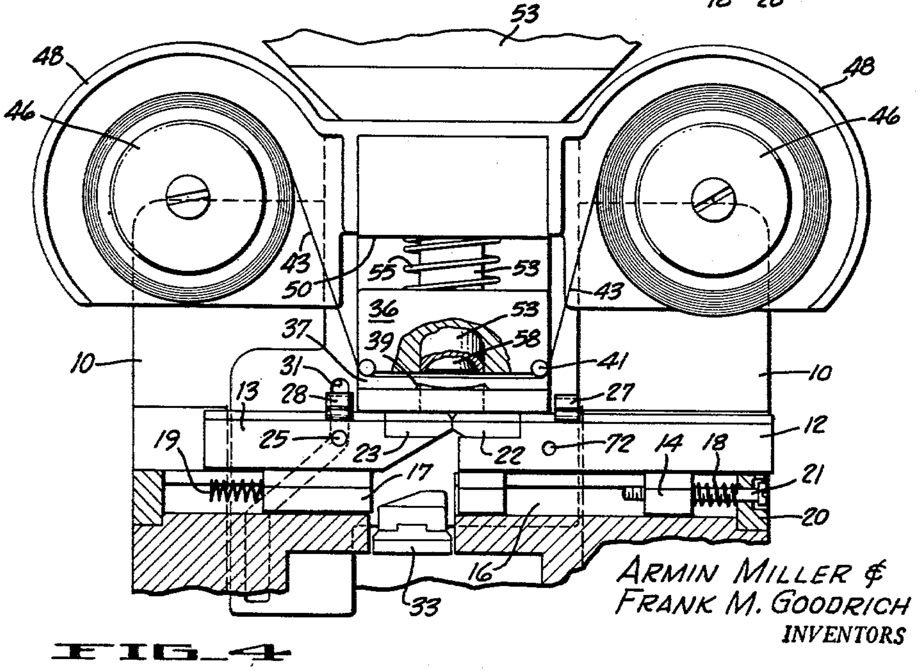
FIGURE 4 is a front elevation of the arrangement of FIGURE 1, showing the position of operation in which the two ends of the magnetic tape strips have been butted together.
Figure 5:
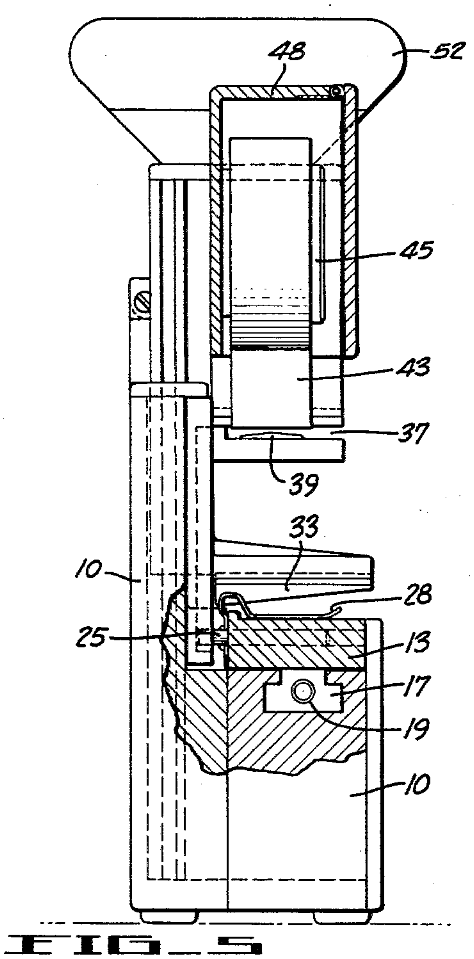
FIGURE 5 is an end elevation, partly broken away, of the arrangement of FIGURE 1.
Figure 6:
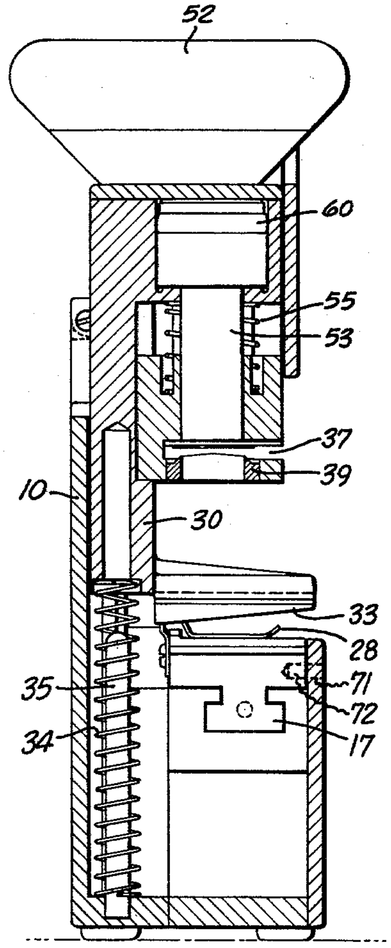
FIGURE 6 is an end sectional view, taken along the line 6—6 in FIGURE 1 and looking in the direction of the appended arrows.
Figure 7:
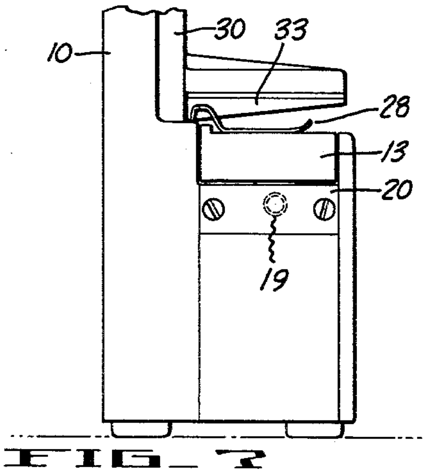
FIGURE 7 is an end elevational view of a fragment of the arrangement of FIGURE 1.
Figure 8:
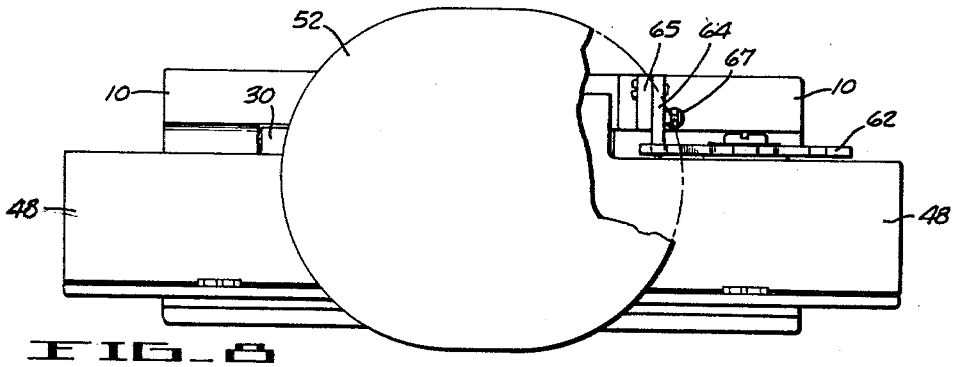
FIGURE 8 is a plan view, partly broken away, of the arrangement of FIGURE 1.
Figures 13, 14, 15:
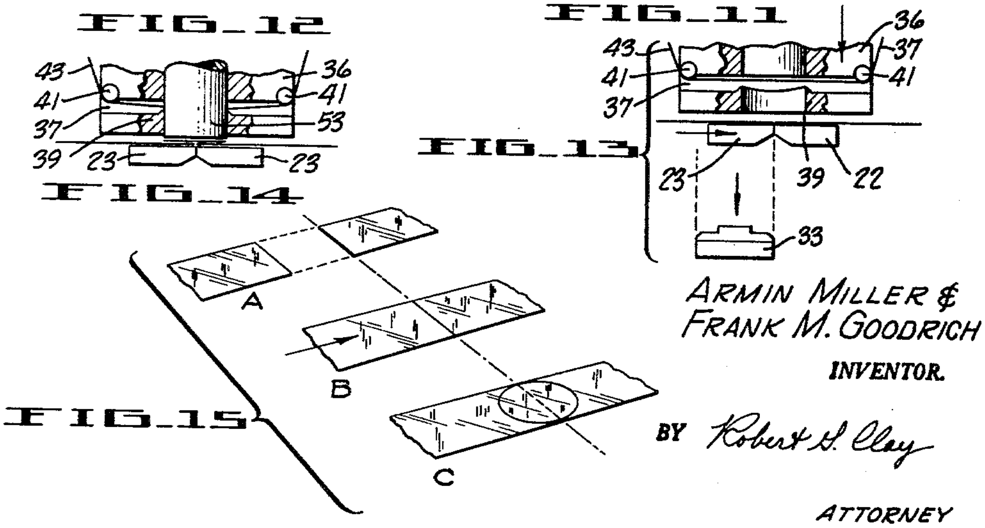
FIGURE 13 is a simplified diagrammatic representation of the relationship of the splicing tape punch to the ends of the strips immediately prior to cutting out a piece of the splicing tape.
FIGURE 14 is a simplified diagrammatic representation of the operative relationship of the punch, the splicing tape and the strips immediately prior to affixture of the splicing tape to the strips.
FIGURE 15 is a simplified representation of fragments of the strips which are to be spliced and the successive relationships which are employed in the splicing.

In the next stage of operation, as shown in FIGURES 4 and 13, the downward movement of the support plate 30 carries the shear block 33 below the stationary table 12 and the movable table 13. When this extent of movement has been reached, the follower pin 25 has passed through the angularly disposed segment of the guide slot 31 on the support plate 30, moving the cutting blade 23 of the movable table 13 into contact with the opposite cutting blade 22. Here again, it is to be noted that a very slight movement is imparted to the stationary table 12, by the pressure of the abutting surfaces of the cutter blades 22, 23 overcoming the force of the spring 18. The cleanly sheared edges of the two magnetic tape segments are therefore placed in exact abutting relationship, as is shown in the view marked B in FIGURE 15; and the vertical axis along which these tape segments join and the surfaces of the cutting blades 22, 23 abut may therefore be taken as the operative axis of the system. The punch 53 and the circular die 39 are coaxially mounted about this operative axis.

As may be seen in the view of FIGURE 4 particularly, at the completion of the second stage of the operation the facing surface of the die holder 36 including the circular die 39, presses against the tables 12, 13 through the intervening tape segments. Accordingly, further movement of the die holder 36 is restricted. Thereafter, as downward movement of the head 52 continues, the operative lower edge of the punch 53 protrudes through the die holder 36 and forces the associated segment of splicing tape 43 against the upper part of the circular die 39. The adhesive side of the splicing tape 43 faces the abutting magnetic tape segments, and as the punch 53 registers with and passes through the circular die 39, a circular cut is taken out of the splicing tape 43. As shown in FIGURE 14, this circular cut of splicing tape 43 is then placed, adhesive side down, on the two segments of magnetic tape, and overlaps the two segments equally, as is shown in the view desigated C in FIGURE 15.

The final stage of the operation is the completion of the splice by the application of pressure to the circular splicing tape segment. This pressure is exerted uniformly at the termination of the downward movement of the head 52, because of the presence of the resilient pads 58 and 60 between the punch insert 57, the punch body 50 and the punch cylinder 53. The end of the punch 53 which engages the upper surfaces of the two tables 12, 13 through the magnetic tape and splicing tape segments cannot move further downward. The interior punch insert 57, however, is not restricted in movement except by the pressure pad 58 and the upper rubber pad 60. Similarly, there is freedom of movement between the punch 53 and the punch body 50 to a limted extent. Therefore, the continued downward movement of the head 52 acts upon the head portion of the punch insert 57. The force exerted is adequate to compress the rubber pad 60 sufficiently for the punch insert 57 to cause the rubber pressure pad 58 to protrude below the lower end of the punch 53. The pressure pad 58 therefore acts upon the segment of splicing tape 43 directly, and because of its resiliency and tendency to conform to the surfaces against which it is pressing, eliminates bubbles and wrinkles which might otherwise tend to form in the splice.

It may therefore be seen that a single downward movement of the head, over a relatively limited extent of travel completes the action which is desired for trimming, joining and splicing the edges of the two tape segments. After the splice is made, pressure on the handle or head 52 may be relaxed, and the compression springs 35 and 55 act to return the movable elements upwardly. After the die member 39 has cleared the spliced tape, and before the block 33 has risen to the level of the tables 12, 13, the spliced tape may be removed. Alternatively, the movable elements may be allowed to return to the original positions shown in FIGURE 1. Thus, the block 33 lifts the spliced tape somewhat, with the spring clips 27–28 resiliently permitting such movement of the tape; and the spliced tape may be removed at the end of the operation. During this cycle of operation, a new segment of splicing tape 43 is placed under the punch 53, because of the sprocket wheel arrangement shown in detail in FIGURES 9 and 10. During the downward movement of the cartridge 48, a segment of splicing tape 43 which passes through the channel 37 moves a lesser amount than do the spools 45, 46, because of the limitation on the movement of the die holder 36. During this interval, the loop on the takeup side is drawn in, because the advance tab 64 engages the closest adjacent tooth on the sprocket wheel 62, rotating the sprocket wheel 62 and also the takeup spool 46. This rotation is counter-clockwise, as viewed in FIGURE 9, but clockwise as viewed in FIGURES 1, 3 and 4. The tab 64 does not interfere with passage of the next tooth of the sprocket wheel 62, because it rotates out of position and is then brought back into operative relationship to the sprocket wheel 62 by the tension spring 67. The supply spool 45 is braked in rotation as by means of friction resulting, for example, from tightness of the axial bolt thereof.

Automatic splicers constructed in accordance with the present invention have relatively few parts, and require little expensive machining. They are therefore low in cost, particularly when considered with respect to the speed and precision with which the splicing operation is performed. Without the necessity for high precision machining, for example, such splicers may operate to an accuracy of .002 inch or less. The splices that are formed may occasionally be found to have a minor amount of air bubbles, but it has been established that these do not interfere with the reliability of the joinder between the two segments. Furthermore, if used with magnetic tape systems employing conventional pinch rollers, it is found that any air bubbles, which might exist, are virtually eliminated on the first pass through the pinch rollers.

The splicers may be constructed in accordance with the invention to operate with magnetic tape of any width; and have actually been constructed and used with tapes of all standard widths, from ¼-inch to 2 inches and wider. As previously discussed, they may also be employed with other strip materials such as film, with or without magnetic tape stripping. The complete operation may be carried out in a very few seconds, including the positioning of the strip segments which are to be joined.

For editing purposes, it may, under some circumstances, be desired to confine the use of a device according to the invention to the shearing function alone. For example, when it is desired to cut out a segment of the magnetic tape of less length than the span of the cutting block 33, it is necessary to make two cuts, separately. When used for this purpose, one of the cutting blades may be removed from the movable or stationary tables. Alternatively, the tables 12 may be held in a retracted position as by inserting a screwdriver or pin into a hole 71 provided in the front guideway flange of the frame 10, and into a matching hole 72 provided in the table 12. The movement of the punch relative to the die holder may also be restricted, so that the operation is confined to the cutting of one segment of tape along a selected line. When operated as an editor in this fashion, precision of .001 inch can be achieved without modification of the structure, and the use of micrometer or other indexing means as mentioned above may permit precision to the order of one ten-thousandth of an inch.

There has thus been described an improved device for splicing together lengths of strip material, or for editing program material recorded on strips by precisely cutting the strips into segments. Devices in accordance with the invention are characterized by economy of manufacture, ease of operation, the reliability, and strength with which the joint is formed between strip segments.

What is claimed is:

1. Apparatus for automatically trimming, positioning and splicing two sections of strip material comprising first and second means for respectively holding each section on a common plane, third means mounted transverse to the first and second means for transverse movement with respect thereto, therebetween, and at least partly beyond for trimming the ends of the sections, means respectively coupled between the second and third means for moving the second means into abutment with the first means after movement of said third means between and beyond said first and second means whereby the trimmed ends of the sections are brought together, splicing material being carried by the third means in parallel relation to the two sections, the third means being also for severing a portion of the splicing material, and for providing pressure between the severed portion of splicing material and the positioned trimmed ends of strip material whereby the two sections are secured together.

2. A device for splicing together two lengths of strip material, including the combination of first and second means for holding each of the lengths of strip material with their ends in opposed relation along a selected plane, each of the first and second means including a shearing edge, said shearing edges being spaced apart and opposed to each other, third means disposed adjacent the first and second means for passing between the shearing edges and beyond to shear the ends of the strip material, fourth means coupled to the first and second and third means for moving the first and second means into abutting relationship when said third means moves beyond said shearing edges, means spaced apart from the abutting lengths of strip material for providing a length of adhesive splicing material extending across the sheared abutting ends of the strip material, die means mounted on said third means and disposed between the adhesive strip material and the sheared abutting ends of the strip material, punch means mounted on said third means and disposed on the side of the adhesive strip material remote from the die means and including a punch edge conforming to the die means, the punch means also including a resilient central means movable to protrude beyond the punch end, and means coupled to the punch means for moving the punch means through the die means and into engagement with the sheared abutting ends of the strip material when said third means moves beyond said cutting blades, such that a segment of the adhesive splicing material conforming to the die means is punched out and pressed onto the sheared abutting ends of the strip material.

3. A magnetic tape splicer including a pair of separately mounted normally spaced apart tables having surfaces lying in a selected common plane in which the ends of two lengths of tape may be mounted, means for resiliently urging said tables toward one another in their spaced apart positions, each of the adjacent edges of the tables providing a shearing edge which is beveled at the selected plane, the shearing edges lying normal to the selected plane and normal to a selected axis of movement for the tables, a double-edged shear block mounted adjacent the planar surfaces of the tables and spanning portions of said beveled edges of said tables and the space between the shearing edges when the tables are in their normally spaced apart position, the shear block having shearing edges disposed for cooperation with the shearing edges of the tables, movable support means coupled to the shear block for passing the shear block through the selected plane and between the tables and beyond to cut the ends of magnetic tapes maintained on the tables and which extend over the shearing edges of the tables, the movable support means being coupled to at least one of the tables to move the tables together into abutting relationship subsequent to passage of the shear block, and means coupled to the movable support means for impressing a segment of splicing tape on the tapes as the tables are held together with the cut edges of the tapes in abutting relationship.

4. A device for splicing two lengths of magnetic tape together including the combination of a frame, a pair of tables mounted on the frame, each of the tables including a work support surface lying in a common plane and a shearing edge adjacent the other table and lying principally in a plane normal to the selected plane and having a beveled portion in the region of the selected plane, a first of the tables being mounted on the frame for movement along a selected axis into abutting relation with the other table, the second of the tables being mounted on the frame for limited resilient movement along the axis in a direction opposite to the first table, means disposed adjacent the work surfaces of each of the tables for holding a length of magnetic tape maintained thereon in fixed relation to the table, movable support means slidably mounted in the frame adjacent the tables, the movable support means being slidable in a direction normal to the plane of the work support surfaces and being coupled to the first table to move the first table into abutting relationship with the second table, a double-edged shear block mounted on a movable support member and spanning the space between the shearing edges of the tables when the tables are in their separated position, the shear block including shearing edges engaging the beveled portions of the shearing edges of the tables and cooperating with the shearing edges of the tables, the movement of the movable support member passing the shear block through the spacing between the tables and out of the line of the tables, first compression spring means of a selected strength coupled between the frame and the movable support member to normally urge the movable support member in the direction away from the tables, a die holder member fixedly mounted on the movable support member and including a central aperture encompassing an axis extending along the shearing edge of the second table and a channel passing parallel to the plane of the work support surfaces, a die member mounted in the die holder and including an interior die surface positioned between the channel of the die holder and the work support surface of the tables, a punch member slidably mounted in the aperture of the die holder and including a punch having a hollow interior which is slidably movable relative to the remainder of the punch member, the punch conforming to the interior surface of the die, second compression spring means having a selected strength greater than that of the first compression spring means and positioned to urge the punch member in a direction away from the die holder, a punch insert positioned within the hollow interior of the punch and including a resilient tip providing a surface adjacent the cutting edge of the punch, splicing tape cartridge means coupled to the punch member and movable therewith, the splicing tape cartridge means including supply and takeup spools disposed on opposite sides of the die holder, a length of splicing tape mounted between the supply and takeup spools of the cartridge means and passing through the channel of the die holder, a sprocket wheel coupled to the takeup spool of the cartridge means, and means mounted on the frame for successively engaging the teeth of the sprocket wheel as the movable support member and the punch member are moved to cause the shear block to pass between the shearing edges of the tables and the punch member to pass through the splicing tape and the die member into engagement with the work support surfaces of the tables.

5. A machine for trimming strip material, including a pair of opposed tables mounted for relative movement between spaced and abutting positions, each of the tables having a planar surface lying in a common plane and including a shearing edge beveled with respect to said plane on the side confronting the other table, means for supporting each of the tables for movement along an axis parallel to said plane and normal to the shearing edges and for resiliently urging said tables toward one another in said spaced position thereof, and a double edged shear block disposed adjacent the space between and spaced equally from the tables and from the shearing edges thereof when they are in the spaced position and with said block spanning the space between the tables together with portions of said bevelled shearing edges, the shear block being arranged to pass through said plane and at least partially between the tables for cutting strip material positioned on the planar surfaces and extending into the space between the tables.

6. A device for precisely cutting the ends of two lengths of strip material, and for placing the cut ends in abutting relation, including the combination of first and second table members having planar surfaces lying in a selected plane and normally disposed apart, each of the table members having a shearing edge on the side opposite the other table member, the shearing edges lying partly parallel in planes normal to the selected plane and each including a beveled edge at the region of intersection with the selected plane, resilient means coupled to each of the tables for permitting separation of the tables along an axis parallel to said selected plane, means disposed adjacent the planar surfaces on the tables for holding a different length of strip material in position on each of the tables, a double-edged shear block mounted adjacent the planar surface on each of the tables and including shearing edges lying normal to said selected plane and intersecting the selected planar surface at the region of the beveled edges when the tables are in their separated position, means coupled to the shear block for controllably moving the shear block through the selected plane and between the tables and beyond, and means coupled to the means for moving the shear block for providing relative movement between the tables parallel to said selected plane to place the shearing edges of said tables in abutting relationship after movement of said block beyond said tables.

References Cited in the file of this patent

UNITED STATES PATENTS

| | | |
|---|---|---|
| 2,475,351 | Castay | July 5, 1949 |
| 2,643,786 | Baker | June 30, 1953 |
| 2,674,311 | Griswold | Apr. 6, 1954 |
| 2,789,620 | Vano | Apr. 23, 1957 |

FOREIGN PATENTS

| | | |
|---|---|---|
| 12,994 | Great Britain | May 27, 1915 |
| 169,354 | Great Britain | Sept. 29, 1921 |